Figure 1:
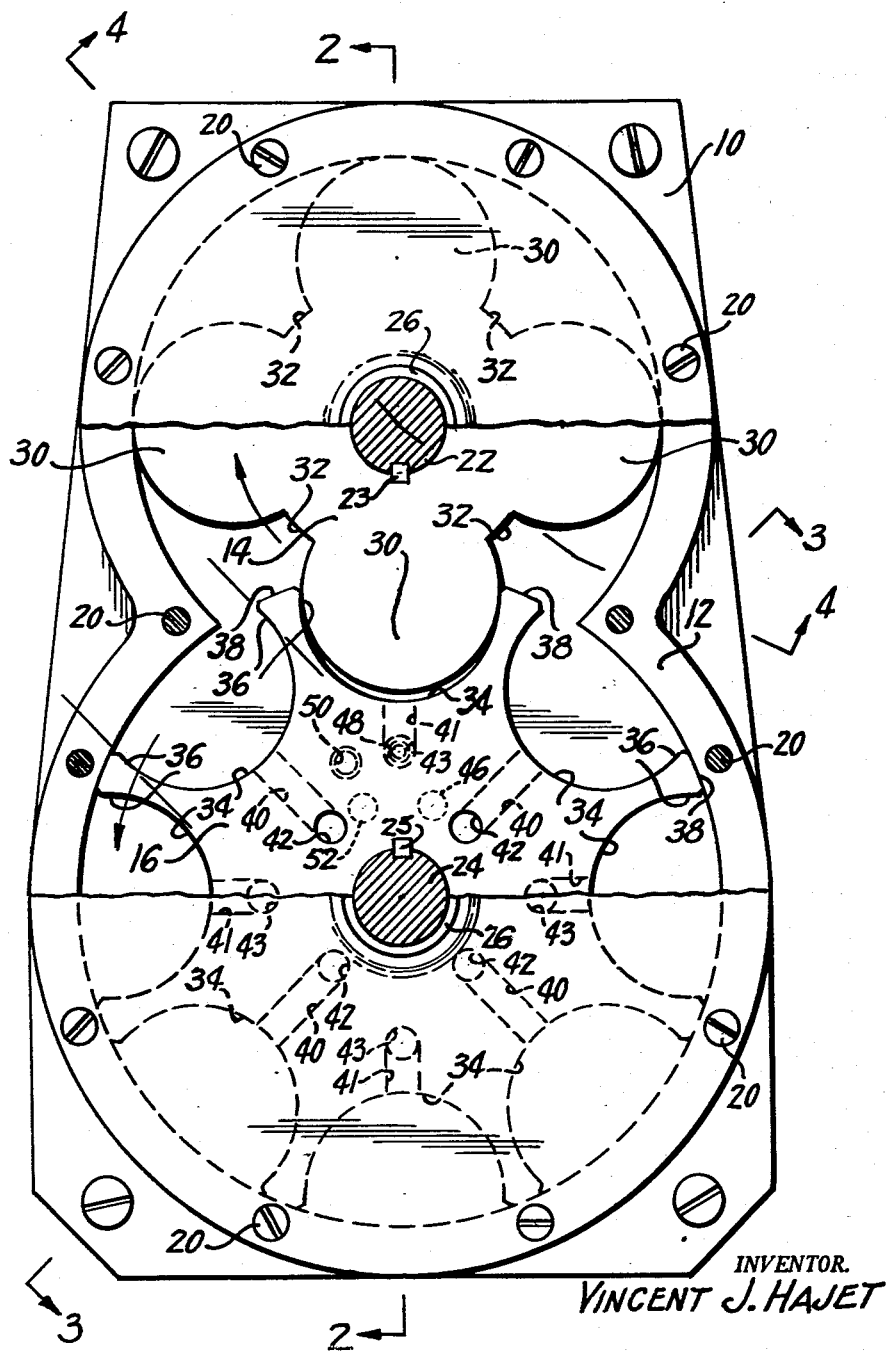

Jan. 14, 1964  V. J. HAJET  3,117,562
ROTARY GEAR TYPE INTERNAL COMBUSTION ENGINE
Filed April 11, 1961  2 Sheets-Sheet 1

INVENTOR.
VINCENT J. HAJET

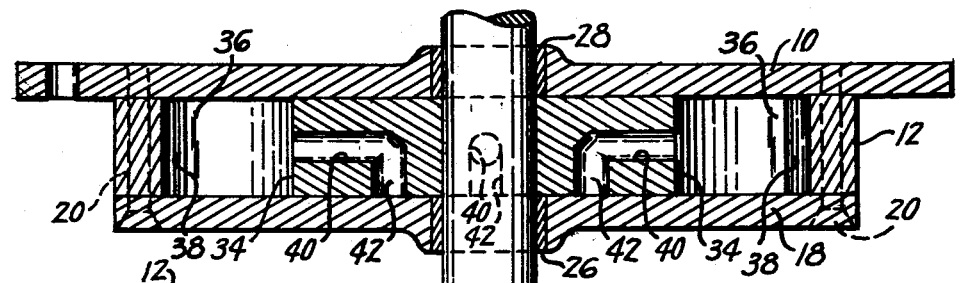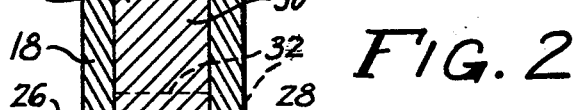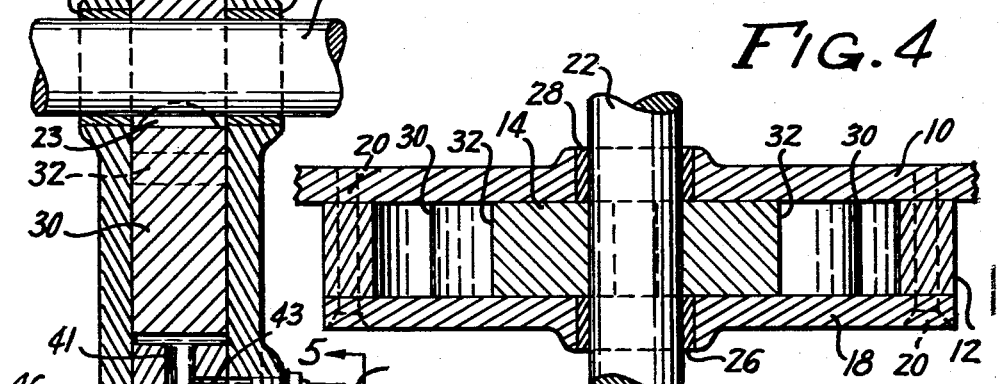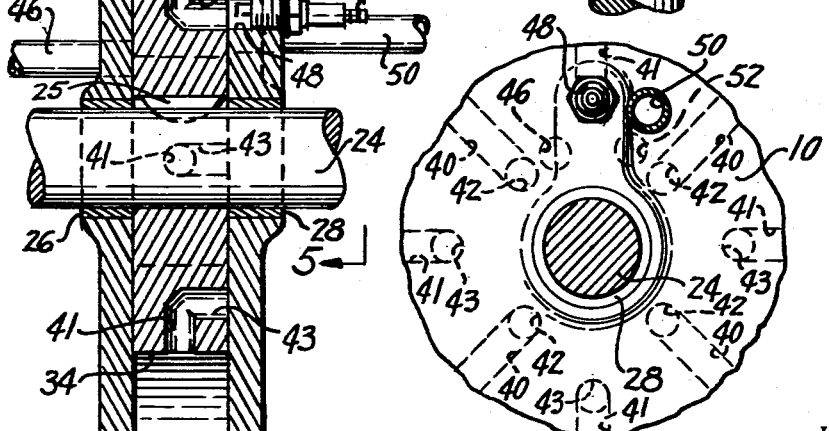

United States Patent Office 3,117,562
Patented Jan. 14, 1964

3,117,562
ROTARY GEAR TYPE INTERNAL
COMBUSTION ENGINE
Vincent J. Hajet, 3360 Broadway, Boulder, Colo.
Filed Apr. 11, 1961, Ser. No. 102,309
1 Claim. (Cl. 123—13)

This invention relates to internal combustion engines of the rotary gear type wherein the meshing teeth and grooves form the combustion chambers in which the fuel-air mixture is compressed, ignited and expands to provide the motive power to the gear shafts.

The object of this invention is to provide this type of engine with the proper conformation of gear teeth and casing so as to obtain a good volumetric efficiency and proper sealing clearances between the parts during the combustion cycles.

Another object is to use a pair of gears with meshing teeth in which the tooth on one of the gears has a substantially circular periphery and the other gear has a matching radially extended groove with a semi-circular bottom and substantially parallel sides forming the sides of its adjacent teeth.

A further object is to provide suitable inlet, ignition and exhaust ports through the casing and gear hub of one of the gears into the combustion chambers, this one gear preferably being the larger one and the one with the semi-circular bottomed grooves.

A further object is to provide more than one smaller gear with the circular teeth around a common larger gear to increase the number of combustion chambers that may be simultaneously operated around said larger gear.

A further object is to use a circular tooth gear, with a circular groove gear of twice the pitch diameter, the number of teeth being four on the small gear, with eight cooperating grooves on the larger gear.

Other and more specific objects will appear in the following detailed description of a preferred form of the invention, as illustrated in the accompanying drawings, wherein:

FIG. 1 is a front view of the engine with the face plate broken away to show the meshing of the gear members at dead center on the compression stroke, FIG. 2 is a vertical axial cross section taken on the line 2—2 of FIG. 1, FIG. 3 is a detail sectional view taken on the line 3—3 of FIG. 1, FIG. 4 is a detail sectional view taken on the line 4—4 of FIG. 1, and FIG. 5 is a rear view of the back plate of the engine taken on the line 5—5 of FIG. 2.

The engine may be built on a mounting plate 10 serving as the rear cover of the casing 12 formed around the gears 14 and 16 and closed over the front by front cover 18. Suitable gaskets (not shown) for the covers and flat head screws 20 may be used to assemble the casing in sealed relation providing suitable clearances for operation of the gears between the covers, on their shafts 22 and 24, respectively. These shafts are mounted in suitable bearings 26 and 28 in the front and rear covers, respectively.

Either of the shafts 22 or 24, or both, may be used as the drive shaft(s). The smaller gear 14 preferably has four circular teeth 30 having a periphery of about ¾ of a circle extending between the bottoms 32 of adjacent grooves, which are arcuate and substantially concentric with the shaft 22 of the gear 14.

The larger gear 16 has a pitch diameter preferably twice that of the smaller gear 14 and therefore has eight correspondingly semi-circular bottomed grooves 34 with parallel sides 36 extending to the tops 38 of adjacent teeth which are arcuate and substantially equal in extent to the arcuate bottoms 32 of the grooves of the smaller gear 14.

The operation of the engine may be carried out, in accordance with the form illustrated in the drawings, on the principle of a four-stroke cycle engine, where the grooves 34 in the larger gear 16 having the short ports 41, perform the compression and power strokes in cooperation with the corresponding circular lobe teeth 30 of the smaller gear 14, and the expanded gases, after the release of residual pressure through registry of openings 43 with the scavenging port 50, are carried around the periphery of the circular housing portions in the corresponding grooves of both gears, to be exhausted through a groove 34 having a long port 40. These grooves with the long port continuously carry a portion of the residual gases, and in cooperation with the corresponding lobes 30 which carry similar gases in the grooves ahead of them, perform the exhaust and intake strokes as their openings 42 of the long ports 40 register with the exhaust port 46 and intake port 52 respectively, the fresh fuel charges being then carried by the respective grooves of both gears around the circular peripheries of the housing portions, to be returned to the alternate grooves 34 with the short ports 41 for the compression and power strokes of the successive cycles of operation.

Thus it will be observed that alternate grooves in each gear carry residual exhaust gases and fresh fuel charges around their respective peripheries, to be combined with contents in opposing grooves as they come together for the successive alternate compression and exhaust strokes in the successively formed fuel charge compression chambers and residual gas exhaust chambers in the alternate grooves of the larger gear.

Ignition is provided by a spark plug mounted in port 48 in the rear cover plate, when the fuel charge is compressed and opening 43 of the short port 41 is in registry with port 48.

There are thus 2 complete four-stroke cycles of operation performed per revolution of the smaller gear, or 4 cycles per revolution of the larger gear, with the resulting 2 to 1 gear ratio between the shafts. Power drive can be taken off from either one or both of the shafts, the gears themselves will provide the flywheel effect to carry the engine through the intermittent exhaust-intake-compression stroke phases between successive power strokes of the cycles of operation.

Fuel may be supplied through a carburetor, not shown, connected to the intake port 52, or it may be injected into the fresh air charges taken in through port 52, especially into those portions of these fresh air charges which are contained in the grooves between the lobes 30 of the smaller gear 14, because the portions which remain in the grooves 34 of the larger gear 16 are exhausted with an exhaust charge from one of the smaller gear grooves through the long ports 40 and the exhaust port 46.

The general arrangement of parts as illustrated may also be used for two-stroke cycle operation, thus doubling the number of power strokes per revolution of either gear, if the ports 40 and 41 are modified by making them all long, each having an opening like 42 in the front face of the gear, for registry with an intake port in place of the port 46, and an exhaust port in the place of the port 52, and having an additional opening like 43 in the rear face for registry with the ignition port 48 and the exhaust release port 50. Efficient operation will of course depend on proper design of parts and the arrangement of the several ports.

The position of the gears as shown in FIG. 1 indicates that the engine is on one of its dead center positions between the end of its compression stroke and the beginning of its expansion or power stroke, the chamber between the lowest tooth of the smaller gear and the corresponding uppermost groove of the larger gear having been reduced to the minimum volume, or to the compression for which the engine is designed. While the expansion strokes are of short duration, there are four of them per revolution of the larger gear, extending over approximately a total period of half a revolution. The gears act as a flywheel in carrying the engine through the intermittent intake, compression and exhaust portions of the cycles. With proper design these intermittent intervals may be considerably reduced and a substantially continuous power torque may be obtained from the more extended power portions of the cycles.

For simplicity, the ports are all shown as circular. However, in actual practice they would be designed in ovoid shape, with the major axes extending substantially radially, for reducing the angular overlap period of the intake and exhaust ports during each cycle of operations, so as to obtain maximum volumetric efficiency.

With just the two gears shown, we have two cycles of four-stroke operation per revolution of the smaller gear. By adding similar smaller gears around the larger gear and altering the shape of the casing 12 accordingly, additional cycles of operation could be simultaneously performed to multiply the power of the engine in accordance with the number of smaller gears that were used. Thus, the addition of three more smaller gears 14 distributed at 90° intervals around the larger gear 16, would produce four times the power obtained from the engine as shown, having just one gear 14. The specific weight per horsepower could thus be greatly reduced.

The engine could also be made to operate under a different compression ratio by adjusting the semi-circular groove bottoms radially with respect to the gear axis. A large gear 16 could be designed for any compression ratio desired.

In order to reduce friction losses, the circular teeth could be made as separate rollers held in non-friction cradle bearings in the hub of gear 14.

The present design is especially adapted for high speed vibrationless operation since the rotary elements are substantially symmetrical in form and could be readily dynamically balanced.

Many other obvious modifications in details, arrangement and design of the parts could be made without departing from the spirit and scope of the present invention, as defined in the appended claim.

What is claimed is:
An internal combustion engine comprising
a pair of gears, the lobe teeth of one gear having circular peripheries extending for approximately 270° between their junctures with adjacent groove bottoms,
said groove bottoms extending arcuately concentrically of said gear,
the grooves between the teeth of the other gear having semi-circular bottoms meshing with the lobe teeth of said one gear to provide a compression chamber clearance in said circular bottom when a tooth of said one gear is lined up with the corresponding groove of said other gear,
the latter groove having sides extending parallel to the radial axis of said groove to the tops of adjacent teeth on said other gear,
said tops being arcuately concentric with the axis of said other gear and extending for a distance corresponding to the bottoms of the grooves on said one gear,
a gear casing having circular portions in close proximity to the outer edges of said gear teeth and cover plates for the opposite sides of said gears fixed and sealed to said circular portions,
said other gear having ports extending radially from the bottoms of its semi-circular grooves through openings in the opposite faces of the gear hub at different radial distances on each face respectively,
said cover plates having cooperating intake, ignition and exhaust ports for timed registry with said openings in each radially extending port during corresponding cycle operations, and
an ignition device in said ignition port,
said radial ports from alternate groove bottoms extending through face openings at the radial distance from the center of said other gear corresponding to the ignition port radial distance,
the ports from the other groove bottoms extending through the face openings at the radial distance corresponding to that of the intake and exhaust ports.

References Cited in the file of this patent
UNITED STATES PATENTS

| | | |
|---|---|---|
| 1,240,112 | Winger | Sept. 11, 1917 |
| 2,215,096 | Fanberg | Sept. 17, 1940 |
| 2,270,222 | Rea et al. | Jan. 13, 1942 |
| 2,431,817 | Mann | Dec. 2, 1947 |
| 2,622,787 | Nilsson | Dec. 23, 1952 |
| 2,799,253 | Lindhagen et al. | July 16, 1957 |

FOREIGN PATENTS

| | | |
|---|---|---|
| 250,250 | Italy | Sept. 23, 1926 |
| 594,113 | Great Britain | Nov. 3, 1947 |